United States Patent
Hart et al.

(10) Patent No.: US 9,773,033 B2
(45) Date of Patent: Sep. 26, 2017

(54) STORING AND RETRIEVING VOLUMES IN A DATABASE BY VOLUME ATTRIBUTES

(75) Inventors: Brian W. Hart, Austin, TX (US); Frederick L. Moss, Austin, TX (US); Ricardo S. Puig, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 12/471,051

(22) Filed: May 22, 2009

(65) Prior Publication Data

US 2010/0299341 A1 Nov. 25, 2010

(51) Int. Cl.
*G06F 17/30* (2006.01)

(52) U.S. Cl.
CPC .. *G06F 17/30315* (2013.01); *G06F 17/30442* (2013.01)

(58) Field of Classification Search
CPC ............. G06F 11/1471; G06F 11/1435; G06F 2201/84; G06F 11/2056; G06F 3/0614
USPC .................................. 707/769, 812; 711/173
See application file for complete search history.

(56) References Cited

U.S. PATENT DOCUMENTS

| | | | |
|---|---|---|---|
| 5,495,607 A * | 2/1996 | Pisello et al. | 707/797 |
| 7,136,801 B2 | 11/2006 | Leonhardt et al. | |
| 7,529,744 B1 * | 5/2009 | Srivastava et al. | |
| 7,657,578 B1 * | 2/2010 | Karr et al. | 707/610 |
| 7,975,136 B1 * | 7/2011 | Yin | 713/2 |
| 2002/0103889 A1 * | 8/2002 | Markson | H04L 67/1097 709/223 |
| 2003/0204597 A1 * | 10/2003 | Arakawa et al. | 709/226 |
| 2004/0107422 A1 * | 6/2004 | Cabrera et al. | 719/310 |
| 2004/0181641 A1 * | 9/2004 | Nguyen | G06F 3/061 711/162 |
| 2006/0047930 A1 * | 3/2006 | Takahashi et al. | 711/162 |
| 2006/0248088 A1 * | 11/2006 | Kazar et al. | 707/10 |
| 2006/0248306 A1 * | 11/2006 | Suishu et al. | 711/170 |
| 2007/0094378 A1 * | 4/2007 | Baldwin et al. | 709/223 |
| 2008/0022062 A1 * | 1/2008 | Nagahori et al. | 711/163 |
| 2008/0082558 A1 | 4/2008 | Uno | |

(Continued)

FOREIGN PATENT DOCUMENTS

| | | |
|---|---|---|
| JP | 062229475 A | 10/1987 |
| JP | 2001290713 A | 10/2001 |

(Continued)

*Primary Examiner* — Kris Mackes
*Assistant Examiner* — Soheila (Gina) Davanlou
(74) *Attorney, Agent, or Firm* — Yudell Isidore PLLC

(57) ABSTRACT

A method, a system and a computer program product for storing one or more volume attributes in a database. The system receives one or more volume attributes which are associated with one or more volumes within a storage system. One or more search terms are assigned to the volume attributes. The one or more volumes and one or more volume attributes are dynamically associated with a location of the one or more volumes. The system assigns the one or more search terms, the one or more volume attributes, and the location of the one or more volumes to the database. The database is stored at a local database and/or an external database. When one or more of the volume attributes are identified during an inquisition for the one or more volumes, the volumes are dynamically retrieved from one or more of the local database and/or an external database.

20 Claims, 5 Drawing Sheets

(56) References Cited

U.S. PATENT DOCUMENTS

| 2008/0104350 | A1* | 5/2008 | Shimizu et al. ............... 711/165 |
| 2009/0043959 | A1* | 2/2009 | Yamamoto ............ G06F 3/0608 |
| | | | 711/112 |
| 2009/0199041 | A1* | 8/2009 | Fukui et al. ....................... 714/6 |
| 2009/0228676 | A1* | 9/2009 | Naganuma et al. .......... 711/173 |
| 2009/0240910 | A1* | 9/2009 | Inomata et al. ............. 711/171 |

FOREIGN PATENT DOCUMENTS

| JP | 2004503874 A | 2/2004 |
| JP | 2005346893 A | 12/2005 |
| JP | 2006023797 A | 1/2006 |
| JP | 2006099748 A | 4/2006 |
| JP | 2006106993 A | 4/2006 |
| JP | 2007502470 A | 2/2007 |
| JP | 2008084254 A | 4/2008 |
| JP | 2008520058 A | 6/2008 |

* cited by examiner

STORING AND RETRIEVING VOLUMES IN A DATABASE BY VOLUME ATTRIBUTES

BACKGROUND

1. Technical Field

The present invention generally relates to computer systems and in particular to storage systems associated with computer systems.

2. Description of the Related Art

Computer systems typically comprise a central processing unit, a memory subsystem and a storage subsystem. Networked computer systems associate a storage subsystem with a local computer system. The local computer system may include a number of independent storage devices or disks housed in a single system. The storage devices and associated computer system(s) are typically connected to several computers (or hosts) via dedicated cabling or via a network. However, a problem exists when operating systems, such as Advanced Interactive eXecutive (AIX), use excessive time and power to retrieve information from storage devices. For example, AIX queries every disk presented to a host in order to retrieve information and/or attributes of interest. Current methods for searching for attributes that are on a disk involve serially searching devices on a bus and querying every visible disk in search of the attributes when the attributes are stored on one of multiple disks.

SUMMARY OF ILLUSTRATIVE EMBODIMENTS

Disclosed are a method, a system and a computer program product for storing one or more volume attributes in a database. The system receives one or more volume attributes which are associated with one or more volumes within a storage system (or subsystem). One or more search terms are assigned to the one or more volume attributes. The search terms are dynamically generated or received via user input to describe the one or more volume attributes. A location for the one or more volumes is also received. The one or more volumes and one or more volume attributes are dynamically associated with the location of the one or more volumes. The system assigns the one or more search terms, the one or more volume attributes, and the location of the one or more volumes to the database. The database is stored at a local database and/or an external database. When one or more of the volume attributes are identified during an inquisition for the one or more volumes, the volumes are dynamically retrieved from one or more of the local database and/or an external database.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
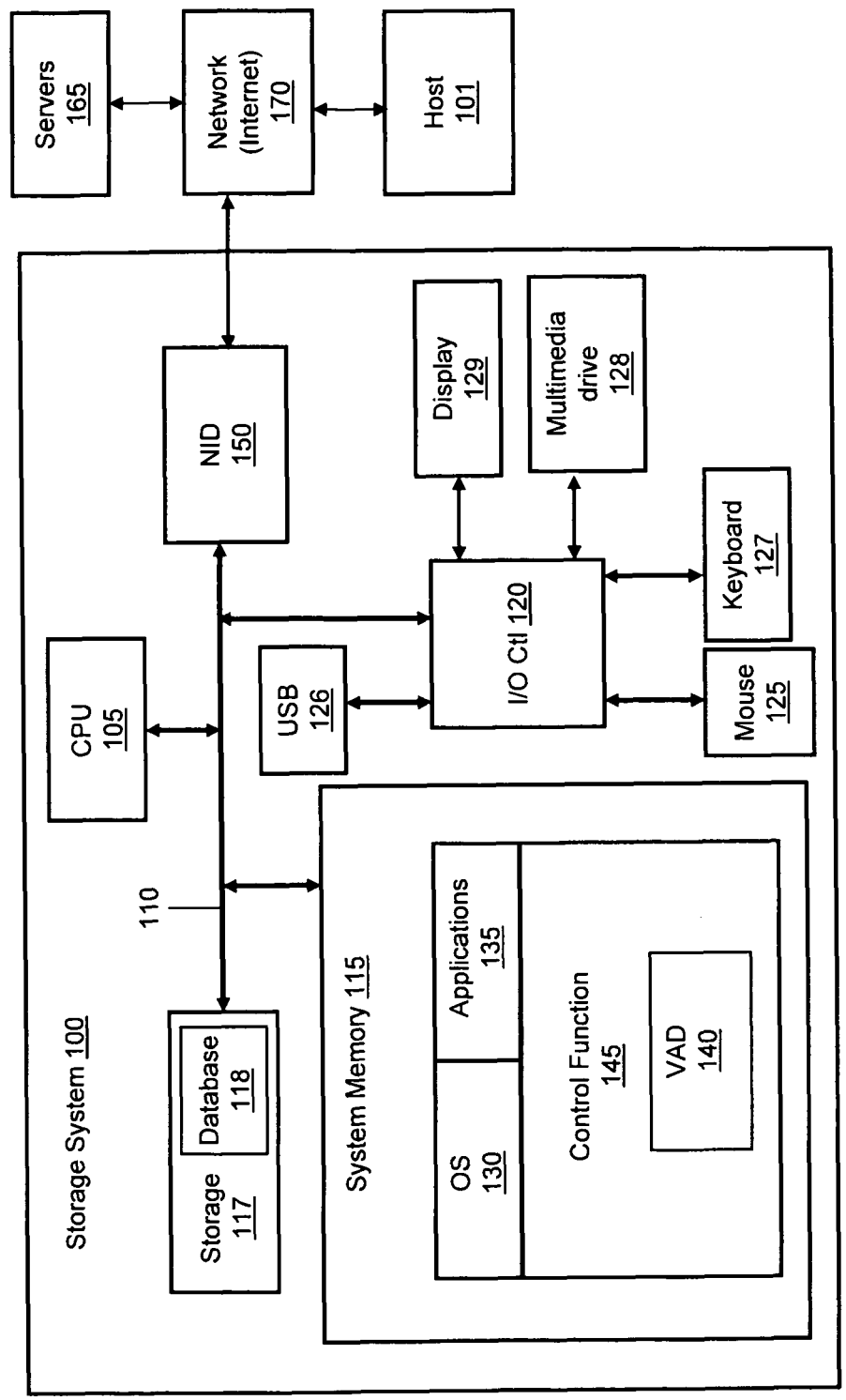
FIG. 1 provides a block diagram representation of a storage system, within which various features of the invention may advantageously be implemented, according to one embodiment of the invention.

The illustrative embodiments provide a method, a system and a computer program product for storing one or more volume attributes in a database. The system receives one or more volume attributes which are associated with one or more volumes within a storage system (or subsystem). One or more search terms are assigned to the one or more volume attributes. The search terms are dynamically generated or received via user input to describe the one or more volume attributes. A location for the one or more volumes is also received. The one or more volumes and one or more volume attributes are dynamically associated with the location of the one or more volumes. The system assigns the one or more search terms, the one or more volume attributes, and the location of the one or more volumes to the database. The database is stored at a local database and/or an external database. When one or more of the volume attributes are identified during an inquisition for the one or more volumes, the volumes are dynamically retrieved from one or more of the local database and/or an external database.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and beginning with FIG. 1, there is depicted a block diagram representation of an example storage system, as utilized within one embodiment. Storage system 100 may be a computer, a portable device, and/or other types of electronic devices that may generally be considered processing devices. As illustrated, storage system 100 comprises at least one processor or central processing unit (CPU) 105 connected to system memory 115 via system interconnect/bus 110. Also connected to system bus 110 is Input/output (I/O) controller 120, which provides connectivity and control for input devices, of which pointing device (or mouse) 125 and keyboard 127 are illustrated. I/O controller 120 also provides connectivity and control for output devices, of which display 129 is illustrated. Additionally, a multimedia drive 128 (e.g., compact disk read/write (CDRW) or digital video disk (DVD) drive) and USB (universal serial bus) port 126 are illustrated, coupled to I/O controller 120. Multimedia drive 128 and USB port 126 enable insertion of a removable storage device (e.g., optical disk or thumb drive) on which data/instructions/code may be stored and/or from which data/instructions/code may be retrieved. Storage system 100 also comprises storage 117, within which data/instructions/code/database, for example database 118, may also be stored and/or retrieved.

Storage system 100 is also illustrated with a network interface device (NID) 150, by which storage system 100 may connect to one or more access/external networks 170, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 150 may be configured to operate via wired/or wireless connection to an access point of the network. Network 170 may be an external network such as the Internet or wide area network (WAN), or an internal network such as an Ethernet (local area network—LAN) or a Virtual Private Network (VPN). Connection to the external network 170 may be established with one or more servers 165 and host computer 101 (similar to storage system 100), which may also provide data/instructions/code for execution on storage server system 100, in one embodiment.

In addition to the above described hardware components of storage system 100, various features of the invention are completed/supported via software (or firmware) code or logic stored within system memory 115 or other storage (e.g., storage 152) and executed by CPU 105. Thus, for example, illustrated within system memory 115 are a number of software/firmware/logic components, including operating system (OS) 130 (e.g., Microsoft Windows®, a trademark of Microsoft Corp, or GNU®/Linux®, registered trademarks of the Free Software Foundation and The Linux Mark Institute), applications 135, and control function 145. Within control function 145 is volume attribute database (VAD) utility 140 (which executes on CPU 110 to provide VAD logic). In actual implementation, VAD utility 140 may be combined with or incorporated within control function 145 to provide a single executable component, collectively providing the various functions of each individual software component when the corresponding combined code is executed by the CPU 105. For simplicity, VAD utility 140 is illustrated and described as a stand alone or separate software/firmware component, which provides specific functions, as described below.

In one embodiment, server 165 includes a software deploying server, and storage system 100 communicates with the software deploying server (165) via network (e.g., Internet 150) using network interface device 160. Then, the VAD utility 140 may be deployed from/on the network, via software deploying server 165. With this configuration, software deploying server performs all of the functions associated with the execution of VAD utility 140. Accordingly, storage system 100 is not required to utilize internal computing resources of storage system 100 to execute VAD utility 140.

CPU 105 executes VAD utility 140 as well as control function 165 and/or OS 130 which support the user interface features of VAD utility 140. Certain functions supported and/or implemented by VAD utility generate processing logic executed by processor and/or device hardware to complete the implementation of that function. For simplicity of the description, the collective body of code that enables these various features is referred to herein as VAD utility 140. Among the software code/instructions/logic provided by VAD utility 140, and which are specific to the invention, are: (a) code/logic for dynamically receiving one or more volume attributes, whereby the volume attributes are automatically assigned to one or more volumes; (b) code/logic for associating one or more search terms with one or more volume attributes; and (c) code/logic for retrieving one or more volumes when one or more search terms are received. According to the illustrative embodiment, when CPU 105 executes VAD utility 140, storage system 100 initiates a series of functional processes that enable the above functional features as well as additional features/functionality. These features/functionality are described in greater detail below within the description of FIGS. 2-5.

Those of ordinary skill in the art will appreciate that the hardware components and basic configuration depicted in FIG. 1 may vary. The illustrative components within storage system 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
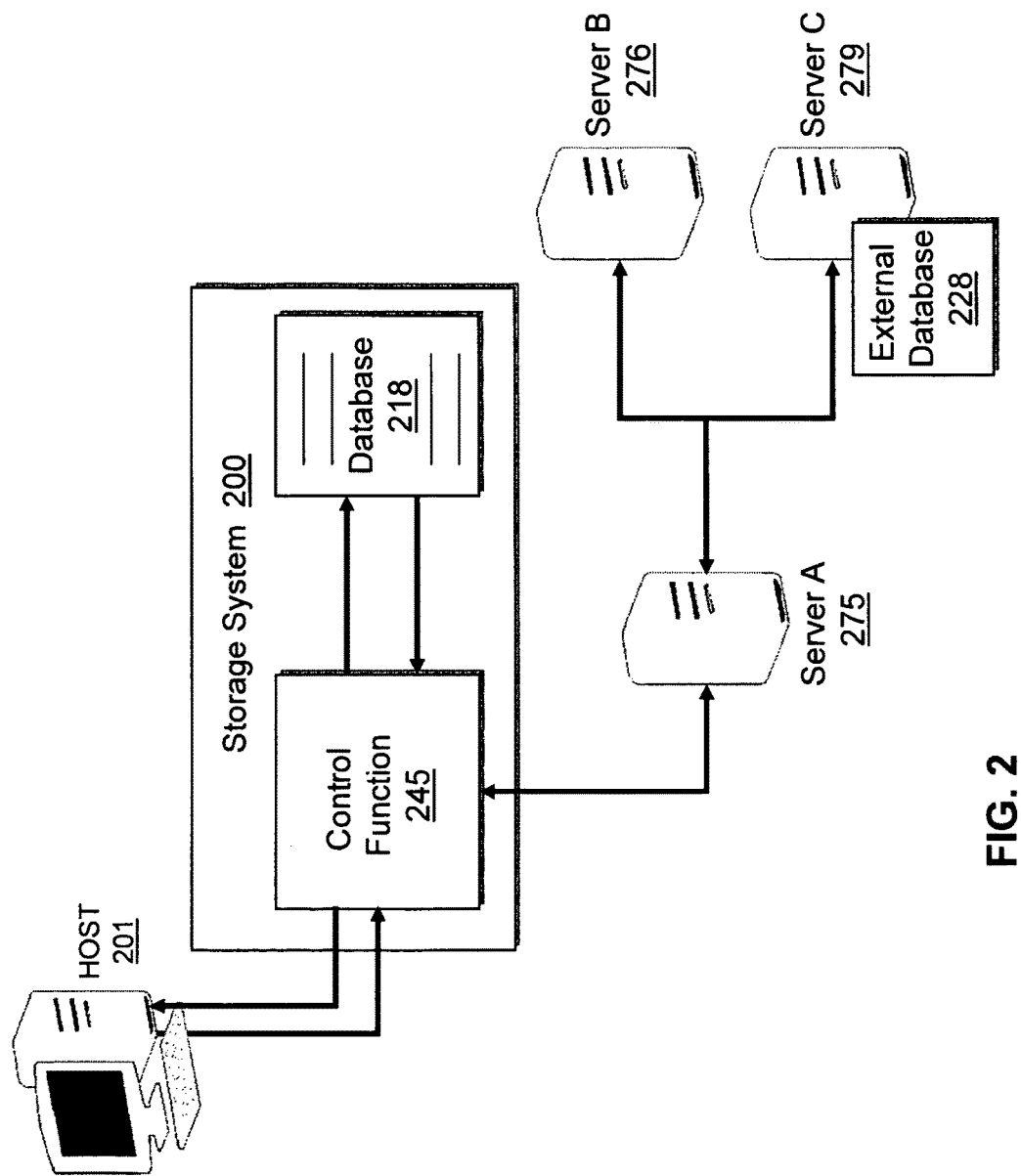
FIG. 2 is a diagram of a network of devices communicating with a control function of a storage system, in accordance with one embodiment of the invention.

With reference now to FIG. 2, which is a diagram of a network of devices communicating with a control function of a storage server. Storage system 200 includes control function 245 and local database 218. Host 201 communicates with control function 245 of storage system 200. Control function 245 also communicates with server A 275, server B 276, and server C 279. Server C 279 includes external database 228.

In one embodiment, one or more devices exist within one or more volumes of a subsystem. The volumes are a collection of disks, treated as one large storage area. Volume attributes are stored on local database 218 and/or external database 228. Volume attributes for one or more volumes are transmitted from sever A 275, server B 276, server C 279, as well as host 201. Control function 245 receives the volume attributes from the one or more locations and stores the volume attributes and the location of the volume on local database 218 (or external database 218). Control function 245 enables host 201 (and storage system 200) to have access to one or more volumes across multiple subsystems.

In another embodiment, the host computer writes to database (local and/or external). When an operating system (OS), system administrator, and/or subsystem management interface requires access to local database 218, control function 245 (via VAD utility 140, FIG. 1) enables host 201 to write to local database 218. Host 201 identifies a volume which is significant to host 201 (e.g. OS, system administrator, and/or subsystem management interface). Host 201 assigns (writes) volume attributes describing the volume and the location of the volume to local database 218 (and/or external database 228). The volume attributes and/or search terms are dynamically generated to describe the volume, and/or received via user input. Control function 245 stores the volume attributes, volume location, and search terms relating to the volume attributes on local database 218 and/or external database 228. At a later instance, host 201 queries the database to retrieve the volume and/or volume location.

In one embodiment, the host (host 201) queries the storage system (storage system 200) for one or more volumes. One or more search terms are received via user input. Host 201 transmits one or more search terms to storage system 200, which describe the volume of interest and/or the volume attributes (of interest). Control function 245 receives the one or more search terms and searches local database 218 to determine which volume attributes are associated with the search terms. When one or more volume attributes are determined to be associated with the search term, control function 245 retrieves one or more volumes (and/or volume locations) that are associated with the volume attributes. When no matches are retrieved from local database 218 utilizing the search terms provided by host 201, external database 228 is automatically searched. When external database 228 successfully provides a volume match for the search terms provided, control function 245 retrieves the volumes (and/or volume locations) associated with the search terms. The volumes and/or volume locations are dynamically presented to host 201 without the host having to perform an additional search for the volume of interest.

Figure 3:
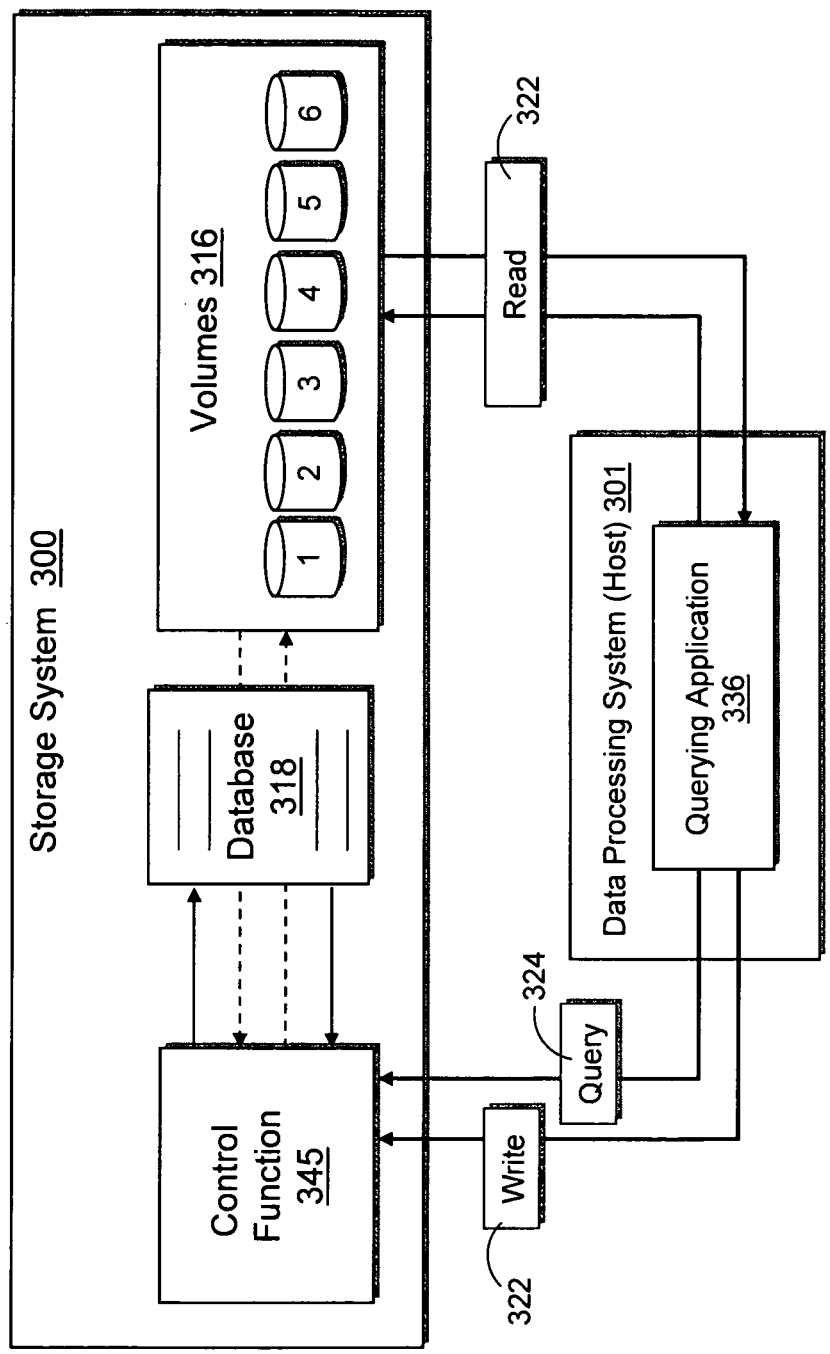
FIG. 3 is a schematic diagram illustrating the querying and writing activity of a storage system, according to one embodiment of the invention.

FIG. 3 illustrates the querying and writing activity of a storage system. Storage system comprises control function 345, database 318, and volumes 316. Data processing system (DPS) host 301 includes querying application 336. DPS host 201 sends and receives information via write command 322, query command 324, and read command 322.

In one embodiment, one or more volume attributes are assigned to each volume associated with the database (database 318). The volume attributes assigned to volumes 316 are one or more of: text strings, variables, alphabetic references, and numeric references. Text strings (e.g. rootvg, bootable, hd5, AIX, mycomputer.mycountry,mycompany-.com) describe the device in which the volume attributes reference. Variables are utilized to store values (e.g. vgname=rootvg, bootable=no, hd5_present=yes, OS_installed=AIX) that reference the volume associated with the volume attributes.

In one embodiment, a host computer communicates with a storage system that contains a database of volume attributes. Control function 345 receives write command 322 from querying application 336 of DPS host 301. Control function submits the one or more instructions received via write command 322 to database 318. Control function enables 345 to receive instruction from DPS host 301. DPS host 301 writes one or more volume attributes to database 318 via write command 322. The volume attributes written to database 318 describe volumes 316, whereby volumes 316 are significant to DPS host 301. One or more volume attributes associated with one or more volumes, of volumes 316, are written to database 318. For example, volume attributes for volume 3 (of volumes 316) are text string "bootable" and the variable "owner" containing value "prod1" (owner=prod1). The volume attributes for volume 5 (of volumes 316) are text string "bootable" and the variable "owner" containing value "prod2" (owner=pord2), and the volume attribute for volume 8 (of volumes 316) is "flash target". A message is dynamically sent to DPS host 301 from control function 345 to confirm the volume attributes are written successfully.

In another embodiment, a query is submitted by a host computer to a control function to retrieve one or more volumes (and/or volume locations). Querying application 336 transmits query command 324 to control function 345. Query command 324 provides one or more search terms to control function 345. The search terms describe the volume, volume, attributes, and/or volume location of interest to querying application 336. The search terms may be alphabetical, numerical, and/or characters that are associated with the volume, volume attribute, and/or volume location. Control function (and VAD utility 140) search database 318 to determine which volume attributes match the search term(s) submitted by query command 324. When a comparable volume attribute is determined, the volume location and/or volume are presented to DPS host 301 and/or querying application 336, via read command 322. A message is sent to DPS host 301 to confirm the volumes are read successfully.

Figure 4:
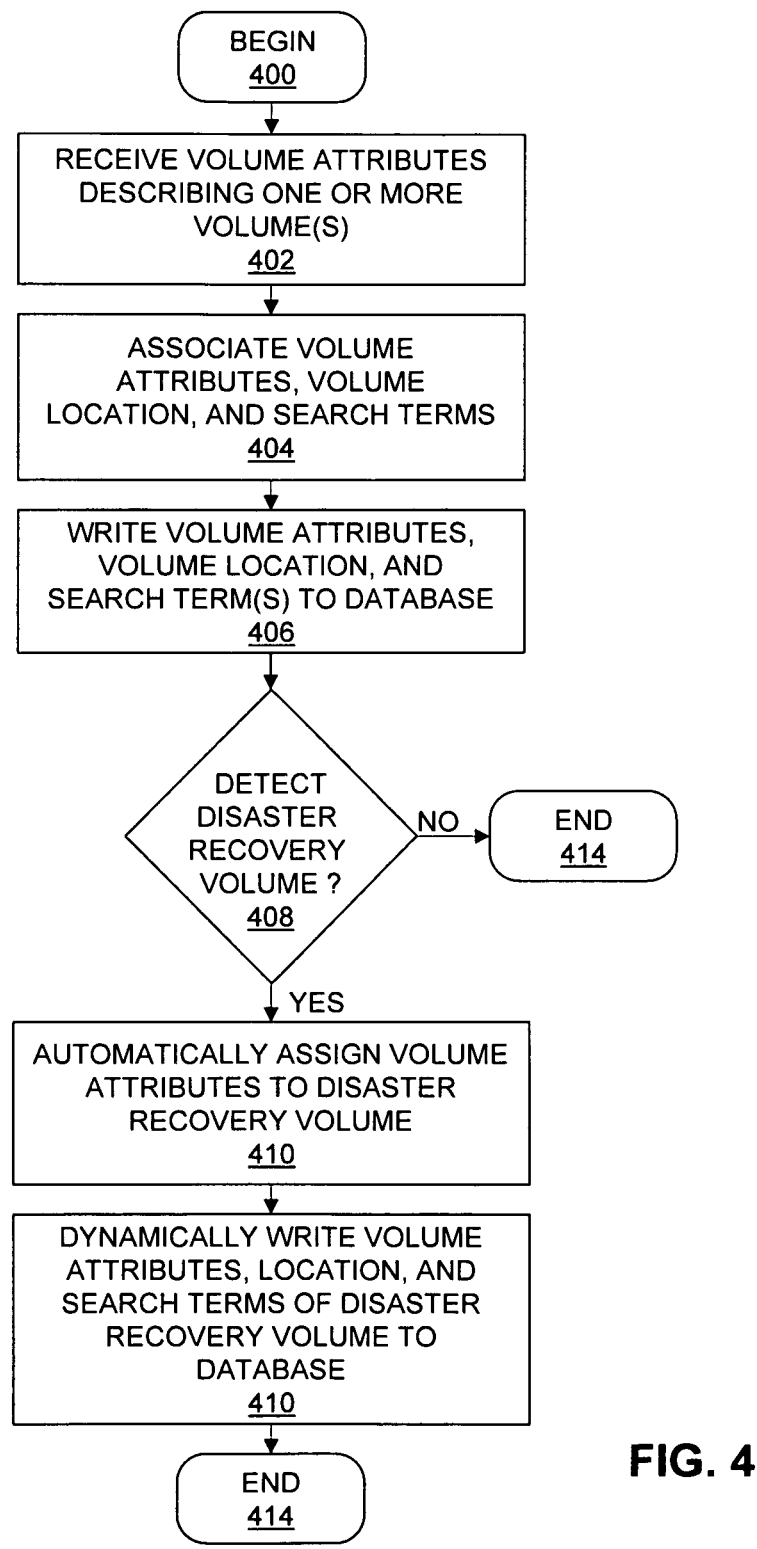
FIG. 4 is a flow chart illustrating the method by which volume attributes are assigned to one or more volumes, in accordance with one embodiment of the invention.
Figure 5:
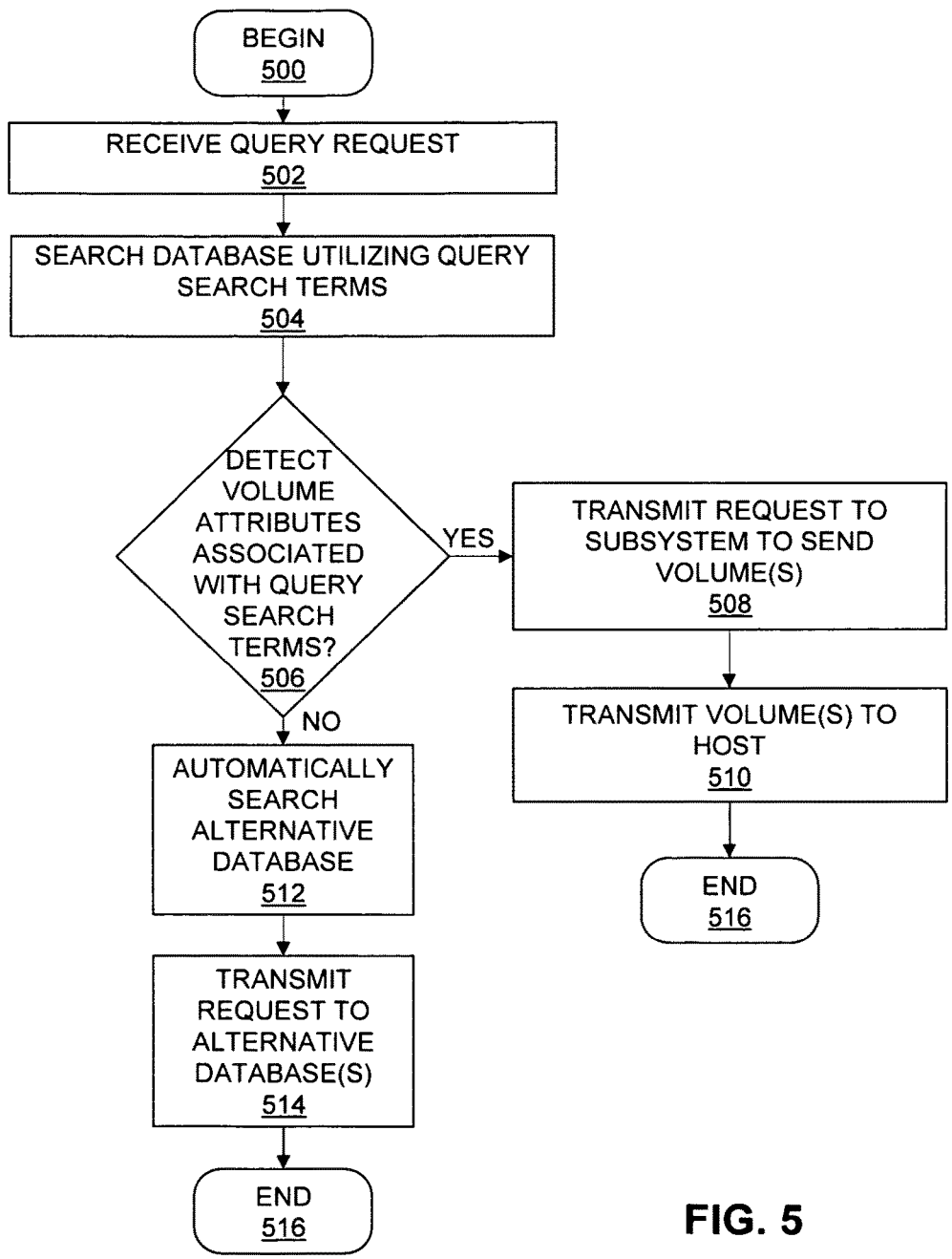
FIG. 5 is a flow chart illustrating the method by which volumes are transmitted to a host device, according to one embodiment of the invention.

FIGS. 4-5 are flow charts illustrating various methods by which the above processes of the illustrative embodiments are completed. Although the methods illustrated in FIGS. 4-5 may be described with reference to components shown in FIGS. 1-3, it should be understood that this is merely for convenience and alternative components and/or configurations thereof can be employed when implementing the various methods. Key portions of the methods may be completed by VAD utility 140 (within control function 145) executing on processor 105 of storage system 100 (FIG. 1). The key portions of the methods control specific operations of control function 145 and storage system 100, and the methods are thus described from the perspective of both VAD utility 140 and control function 165 of storage system 100.

The process of FIG. 4 illustrates the method by which volume attributes are assigned to one or more volumes. FIG. 4 begins at initiator block 400 and proceeds to block 402, at which volume attributes are received. The volume attributes, in the form of text string(s), variables, and alphabetical/numerical descriptions, describe one or more volumes of a computer subsystem. At block 404 the volume attributes are associated with the location of the volume and search terms, whereby the search terms describe the volume and/or volume attributes). VAD utility 140 writes the volume attributes, the location of the volume, and search terms describing the volume to a database at block 406. A decision is made, at block 408, whether a significant volume, such as a disaster recovery volume is detected via VAD utility 140 and/or control function 145 (of FIG. 1). If the disaster recovery volume is not detected, the process ends at block 414. If the disaster recovery volume is detected the process continues to block 410. At block 410 volume attributes are automatically assigned to the disaster recovery volume. The disaster recovery volume attributes, location of the disaster recovery volume, and search terms concerning the disaster recovery volume are dynamically written to the database, at block 412. At block 414 the process ends.

The method by which volumes are transmitted to a host device is depicted in FIG. 5. FIG. 5 begins at initiator block 500 and proceeds to block 502, at which a query request is received. The query request provides one or more search terms that describe one or more volumes, a volume location(s), and/or volume attributes. At block 504 the database is searched utilizing the search terms provided in the query. A decision is made, at block 506, whether one or more volume attributes associated with the search terms are detected. If one or more volume attributes associated with the search terms are not detected, the process continues to block 512. At block 512 one or more alternative (external) database are searched. The query (and search terms) is transmitted to the alternative database at block 514. If one or more volume attributes associated with the search terms are detected, the process continues to block 508. At block 508 a request is transmitted to the respective subsystem to send the volumes to the requesting host. The volumes are transmitted to the host at block 510. The process ends at block 516.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer-implemented method comprising:
a host computer dynamically generating and assigning one or more volume attributes to describe each volume of a plurality of volumes of a storage system, wherein each volume is a storage area comprising a plurality of disks;
the host computer dynamically generating and assigning one or more search terms that describe each of the generated volume attributes;
storing the one or more generated volume attributes and the one or more generated search terms within a local database;
receiving a search query request that includes a first search term to be used to perform a search of the local database;
in response to receiving the search query, searching the local database using the first search term; and in response to identifying, within the local database, at least one search term from among the generated search terms that is associated with the first search term:
   identifying, from the local database, at least one volume attribute of the one or more volume attributes that is associated with the at least one search term; and
   retrieving one or more volumes associated with the at least one volume attribute.

2. The method of claim 1, wherein:
identifying the at least one volume attribute that is associated with the at least one search term further comprises:
identifying a physical location associated with the one or more volumes within at least one corresponding volume attribute in the local database.

3. The method of claim 1, wherein:
generating and assigning the one or more volume attributes further comprises:
   automatically generating and assigning one or more external volume attributes to describe each volume of a plurality of external volumes within an external database, wherein the plurality of external volumes are different from the plurality of volumes; and
   dynamically generating and associating one or more external search terms that describe each of the generated external volume attributes; and
in response to the search of the local database not finding an association between the first search term and the at least one search term from among the generated search terms of the local database, automatically searching the external database using the first search term.

4. The method of claim 2, wherein dynamically retrieving the one or more volumes associated with the at least one volume attribute in the local database further comprises:
   dynamically retrieving the one or more volumes from the physical location;
   in response to determining one or more additional locations are associated with at least one of the one or more volumes, retrieving the at least one of the one or more volumes from the one or more additional locations; and
   transmitting the physical location of each of the one or more volumes to a requesting host.

5. The method of claim 1, wherein:
the one or more volume attributes include at least one of: a list of text strings, one or more variables, one or more keywords, and one or more numbers that reference the plurality of volumes; and
dynamically generating and assigning the one or more search terms further comprises dynamically generating and associating a second one or more search terms to each of the generated volume attributes, wherein each of the second one or more search terms describes a received user input.

6. A computer program product comprising:
a computer-readable storage device; and
program code stored on the computer-readable storage device that when executed by a processor of a computer device configures the computer device to provide the functions of:
   dynamically generating and assigning one or more volume attributes to describe each volume of a plurality of volumes of a storage system, wherein each volume is a storage area comprising a plurality of disks;
   dynamically generating and assigning one or more search terms that describe each of the generated volume attributes;
   storing the one or more generated volume attributes and the one or more generated search terms within a local database;
   receiving a search query request that includes a first search term to be used to perform a search of the local database;
   in response to receiving the search query, searching the local database using the first search term; and
   in response to identifying, within the local database, at least one search term from among the generated search terms that is associated with the first search term:
      identifying, from the local database, at least one volume attribute of the one or more volume attributes that is associated with the at least one search term; and
      retrieving one or more volumes associated with the at least one volume attribute.

7. The computer program product of claim 6, wherein:
the program code for identifying the at least one volume attribute that is associated with the at least one search term further comprises code for:
   identifying a physical location associated with the one or more volumes within at least one corresponding volume attribute in the local database; and
the program code for retrieving the one or more volumes associated with the at least one volume attribute in the local database further comprises code for:
   dynamically retrieving the one or more volumes from the physical location;
   in response to determining one or more additional locations are associated with at least one of the one or more volumes, retrieving the at least one of the one or more volumes from the one or more additional locations; and
   transmitting the physical location of each of the one or more volumes to a requesting host.

8. The computer program product of claim 6, wherein:
the program code for generating and assigning the one or more volume attributes further comprises program code for:
   automatically generating and assigning one or more external volume attributes to describe each volume of a plurality of external volumes within an external database, wherein the plurality of external volumes are different from the plurality of volumes; and
   dynamically generating and associating one or more external search terms that describe each of the generated external volume attributes; and
the program code further comprising code for:
   in response to the search of the local database not finding an association between the first search term and the at least one search term from among the generated search terms of the local database, automatically searching an external database using the first search term.

9. The computer program product of claim 6, wherein:
the one or more volume attributes include at least one of: a list of text strings, one or more variables, one or more keywords, and one or more numbers that reference the plurality of volumes;

the program code for dynamically generating and assigning the one or more search terms further comprises program code for dynamically associating a second one or more search terms to at least one of the generated volume attributes, wherein each of the second one or more search terms describes a received user input.

10. A data processing system comprising:
a processor component; and
a utility, executable by the processor component, comprising logic that causes the processor component to:
  dynamically generate and assign one or more volume attributes to describe each volume of a plurality of volumes of a storage system, wherein each volume is a storage area comprising a plurality of disks;
  dynamically generate and assign one or more search terms that describe each of the generated more volume attributes;
  store the one or more generated volume attributes and the one or more generated search terms within a local database;
  receive a search query request that includes a first search term to be used to perform a search of the local database;
  in response to receiving the search query, search the local database using the first search term; and
  in response to identifying, within the local database, at least one search term from among the generated search terms that is associated with the first search term:
    identify, from the local database, at least one volume attribute of the one or more volume attributes that is associated with the at least one search term; and
    retrieve one or more volumes associated with the at least one volume attribute.

11. The data processing system of claim 10, wherein:
the logic for identifying the at least one volume attribute that is associated with the at least one search term further comprises logic that causes the processor component to:
  identify a physical location associated with the one or more volumes within at least one corresponding volume attribute in the local database; and
the logic for retrieving the one or more volumes associated with the at least one volume attribute in the local database further comprises logic that causes the processor component to:
  dynamically retrieve the one or more volumes from the physical location;
  in response to determining one or more additional locations are associated with at least one of the one or more volumes, retrieve the at least one of the one or more volumes from the one or more additional locations; and
  transmit the physical location of each of the one or more volumes to a requesting host.

12. The data processing system of claim 11, wherein the logic further comprises logic that causes the processor component to:
  in response to the search of the local database not finding an association between the first search term and the at least one search term from among the generated search terms of the local database, automatically search the external database using the first search term.

13. The data processing system of claim 10, wherein:
the one or more volume attributes include at least one of: a list of text strings, one or more variables, one or more keywords, and one or more numbers that reference the plurality of volumes; and
the logic for dynamically generating and assigning the one or more search terms further comprises logic that causes the processor to dynamically generate and associate a second one or more search terms to each of the generated volume attributes, wherein each of the second one or more search terms describes a received user input.

14. The data processing system of claim 12, wherein the logic for generating and assigning the one or more volume attributes further comprises logic that causes the processor component to:
  automatically generate and assign one or more external volume attributes to describe each volume of a plurality of external volumes within an external database, wherein the plurality of external volumes are different from the plurality of volumes; and
  dynamically generate and associate one or more external search terms that describe each of the generated external volume attributes.

15. The method of claim 3, further comprising:
  detecting a disaster recovery volume; and
  in response to detecting the disaster recovery volume:
    automatically generating and assigning one or more disaster volume attributes to describe the disaster recovery volume, wherein the disaster recovery volume comprises a plurality of disks;
    dynamically generating and associating one or more disaster search terms that describe each of the generated disaster volume attributes; and
    storing the one or more disaster volume attributes, a location of the disaster recovery volume, and the one or more disaster search terms to the local database;
  wherein each generated volume attribute includes:
    a text string that identifies whether an associated volume is bootable;
    a text string that identifies an owner of the associated volume; and
    a text string that identifies a flash target of the associated volume.

16. The computer program product of claim 6, further comprising program code for:
  detecting a disaster recovery volume; and
  in response to detecting the disaster recovery volume:
    automatically generating and assigning one or more disaster volume attributes to describe the disaster recovery volume, wherein the disaster recovery volume comprises a plurality of disks;
    dynamically generating and associating one or more disaster search terms that describe each of the generated disaster volume attributes; and
    storing the one or more disaster volume attributes, a location of the disaster recovery volume, and the one or more disaster search terms to the local database;
  wherein each generated volume attribute includes:
    a text string that identifies whether an associated volume is bootable;
    a text string that identifies an owner of the associated volume; and
    a text string that identifies a flash target of the associated volume.

17. The data processing system of claim 10, further comprising logic that causes the processor component to:

detect a disaster recovery volume; and in response to detecting the disaster recovery volume:

automatically generate and assign one or more disaster volume attributes to the disaster recovery volume, wherein the disaster recovery volume comprises a plurality of disks;

dynamically generate and associate one or more disaster search terms that describe each of the generated disaster volume attributes; and store the one or more disaster volume attributes, a location of the disaster recovery volume, and the one or more disaster search terms to the local database;

wherein each generated volume attribute includes:

a text string that identifies whether an associated volume is bootable;

a text string that identifies an owner of the associated volume; and a text string that identifies a flash target of the associated volume.

18. The method of claim 1, wherein:

each search term of the one or more search terms further describe at least one of: a volume and a location of interest of the volume; and each volume attribute includes one or more variables, wherein each variable stores a value that references a particular associated volume, and wherein the one or more variables comprise an indication of a particular installed operating system.

19. The computer program product of claim 6, wherein:

each search term of the one or more search terms further describe at least one of: a volume and a location of interest of the volume; and each volume attribute includes one or more variables, wherein each variable stores a value that references a particular associated volume, and wherein the one or more variables comprise an indication of a particular installed operating system.

20. The data processing system of claim 10, wherein:

each search term of the one or more search terms further describe at least one of: a volume and a location of interest of the volume; and each volume attribute includes one or more variables, wherein each variable stores a value that references a particular associated volume, and wherein the one or more variables comprise an indication of a particular installed operating system.

* * * * *